(12) United States Patent
Schimmelpfennig

(10) Patent No.: US 12,117,040 B2
(45) Date of Patent: Oct. 15, 2024

(54) ROD END MADE OF THERMOPLASTIC FIBER-REINFORCED PLASTIC

(71) Applicant: Albany Engineered Composites, Inc., Rochester, NH (US)

(72) Inventor: Volker Schimmelpfennig, Kaiserslautern (DE)

(73) Assignee: Albany Engineered Composites, Inc., Rochester, NH (US)

( * ) Notice: Subject to any disclaimer, the term of this patent is extended or adjusted under 35 U.S.C. 154(b) by 0 days.

(21) Appl. No.: 18/139,642

(22) Filed: Apr. 26, 2023

(65) Prior Publication Data

US 2023/0265882 A1 Aug. 24, 2023

Related U.S. Application Data

(63) Continuation-in-part of application No. 16/907,659, filed on Jun. 22, 2020, now Pat. No. 11,649,850.

(30) Foreign Application Priority Data

Jun. 23, 2019 (DE) ................. 10 2019 004341.3

(51) Int. Cl.
*F16C 11/06* (2006.01)
*F16B 7/18* (2006.01)
(Continued)

(52) U.S. Cl.
CPC .......... *F16C 11/0614* (2013.01); *F16C 7/026* (2013.01); *F16D 1/06* (2013.01);
(Continued)

(58) Field of Classification Search
CPC .. F16C 7/02; F16C 7/026; F16C 11/04; F16C 11/045; F16C 11/0614; F16C 2208/02;
(Continued)

(56) References Cited

U.S. PATENT DOCUMENTS 3,056,167 A 10/1962 Knoppel
3,279,278 A 10/1966 Eldred
(Continued)

FOREIGN PATENT DOCUMENTS

CN 1170380 A 1/1998
CN 102781650 A 11/2012
(Continued)

OTHER PUBLICATIONS

International Search Report and Written Opinion prepared by the European Patent Office, acting as the International Searching Authority, for international application PCT/US2020/038945 mailed Oct. 14, 2020.

(Continued)

*Primary Examiner* — Adam D Rogers
(74) *Attorney, Agent, or Firm* — McCarter & English, LLP

(57) ABSTRACT

The present invention achieves a high mechanical load capacity of a rod end by means of a component loop that passes around a bearing, where the component may be made of continuous-fiber reinforced composite material with thermoplastic matrix and where the continuous-fiber reinforced composite material with thermoplastic matrix may extend into a threaded stem of the rod end, and the component made of continuous-fiber reinforced composite material with thermoplastic matrix may be enclosed by short-fiber reinforced, long-fiber reinforced, or unreinforced thermoplastic. The threaded stem can be implemented with an external or an internal thread.

17 Claims, 14 Drawing Sheets

(51) Int. Cl.
*F16C 7/02* (2006.01)
*F16D 1/06* (2006.01)

(52) U.S. Cl.
CPC .............. *F16B 7/18* (2013.01); *F16C 2208/02* (2013.01); *F16C 2208/36* (2013.01); *F16C 2208/40* (2013.01); *F16C 2208/52* (2013.01); *F16C 2208/60* (2013.01); *F16C 2208/76* (2013.01)

(58) Field of Classification Search
CPC .............. F16C 2208/20; F16C 2208/36; F16C 2208/40; F16C 2208/52; F16C 2208/58; F16C 2208/60; F16C 2208/76; F16B 7/18; F16D 1/06
See application file for complete search history.

(56) References Cited

U.S. PATENT DOCUMENTS

| | | | |
|---|---|---|---|
| 3,434,373 | A | 3/1969 | Ditlinger |
| 4,050,827 | A | 9/1977 | Jonda |
| 4,080,233 | A * | 3/1978 | McCloskey ......... F16C 11/0614 264/296 |
| 4,097,163 | A * | 6/1978 | Dubuque .................. F16C 7/06 403/46 |
| 4,248,062 | A | 2/1981 | McLain et al. |
| 4,353,267 | A | 10/1982 | Robert |
| 4,411,114 | A * | 10/1983 | Wurtinger ............... F16C 7/026 403/267 |
| 4,552,035 | A | 11/1985 | Skipper |
| 4,811,626 | A | 3/1989 | Bezin |
| 4,857,124 | A | 8/1989 | Shobert et al. |
| 5,129,148 | A | 7/1992 | Adams et al. |
| 5,203,522 | A * | 4/1993 | White ....................... F16J 3/00 244/17.11 |
| 5,374,780 | A | 12/1994 | Pazdirek |
| 6,564,675 | B1 | 5/2003 | Jiang |
| 8,024,993 | B2 | 9/2011 | Dal Prà et al. |
| 8,777,162 | B2 | 7/2014 | Benthien |
| 10,017,244 | B2 | 7/2018 | Mandel et al. |
| 10,487,869 | B2 | 11/2019 | Beale |
| 10,794,419 | B2 | 10/2020 | Coppola et al. |
| 11,453,180 | B2 | 9/2022 | Gralka et al. |
| 11,649,850 | B2 * | 5/2023 | Funck ....................... F16D 1/06 384/280 |
| 2003/0057590 | A1 * | 3/2003 | Loher .................. B29C 43/361 264/157 |
| 2016/0114884 | A1 | 4/2016 | Mandel et al. |
| 2016/0258315 | A1 * | 9/2016 | Vintinner .............. F16C 23/045 |
| 2022/0145915 | A1 * | 5/2022 | Uhl ....................... F16B 17/004 |
| 2023/0061901 | A1 * | 3/2023 | Yasui .................... B29C 70/462 |

FOREIGN PATENT DOCUMENTS

| | | |
|---|---|---|
| CN | 104023952 A | 9/2014 |
| CN | 104879646 A | 9/2015 |
| CN | 107438561 A | 12/2017 |
| CN | 109291469 A | 2/2019 |
| CN | 109676952 A | 4/2019 |
| DE | 1084088 B | 6/1960 |
| DE | 1995788 U | 8/1968 |
| DE | 3610134 A1 | 10/1987 |
| DE | 19615872 A1 | 10/1997 |
| DE | 10 2006 058377 A1 | 6/2008 |
| DE | 10 2010 050221 A1 | 5/2012 |
| EP | 0 930 443 A2 | 7/1999 |
| EP | 3 395 591 A1 | 10/2018 |
| FR | 3018726 A1 | 9/2015 |
| GB | 2260961 A | 5/1993 |
| IE | S 20040798 A2 | 6/2005 |
| IT | UD20110111 A1 | 1/2013 |
| JP | 60-084419 A | 5/1985 |
| JP | (H) 02-080431 U | 6/1990 |
| JP | 03161322 A * | 7/1991 |
| JP | (H) 04-082727 A | 3/1992 |
| JP | 2011-503377 A | 1/2011 |
| JP | 2017-87841 A | 5/2017 |
| JP | 2017-154384 A | 9/2017 |
| JP | 2018-176916 A | 11/2018 |
| RU | 2071930 C1 | 1/1997 |
| RU | 2211820 C2 | 9/2003 |
| RU | 2613434 C2 | 3/2017 |
| SU | 192556 A1 | 5/1967 |

OTHER PUBLICATIONS

Formlabs; "Guide to Compression Molding From Prototyping to Mass Production", see https://formlabs.com/blog/compression-molding/, accessed Jul. 26, 2022, 16 pages.

International Search Report and Written Opinion, prepared by the European Patent Office, acting as the International Searching Authority, for corresponding international application PCT/US2024/024550 mailed Jul. 19, 2024.

* cited by examiner

11

ROD END MADE OF THERMOPLASTIC FIBER-REINFORCED PLASTIC

CROSS-REFERENCE TO RELATED APPLICATION

This application is a continuation-in-part of U.S. application Ser. No. 16/907,659, filed Jun. 22, 2020, which claims the benefit of priority under 35 USC § 119 of German Application No. 10 2019 004341.3, filed Jun. 23, 2019. The foregoing applications are incorporated herein by reference in their entirety.

FIELD OF THE INVENTION

The present invention relates generally to a rod end made of thermoplastic fiber-reinforced plastic that extends, at least partially, around a bearing.

BACKGROUND

Fiber-reinforced plastics are fiber-reinforced materials in which fibrous substances are incorporated into a plastic. They are distinguished by properties including, e.g., high stiffness and strength with comparatively low weight.

In aerospace technology, as in almost no other field of engineering, lightweight design is of preeminent importance. Consequently, innovative lightweight design concepts are especially critical for the competitiveness of many aerospace components.

Rod ends, for example in passenger and cargo aircraft, are made predominantly of metallic materials such as steel, aluminum, and titanium. The use of fiber-reinforced plastics, in particular glass fiber and carbon fiber reinforced plastics, makes it possible to achieve significant weight and/or cost savings due to the great number of such rod ends in an airplane.

Rod ends made of plastic are already known from the prior art.

DE 1,995,788 U discloses a rod end with a plain bushing and threaded stem, wherein the plain bushing and the upper end of the threaded stem are surrounded by a plastic body produced as a single piece in an injection molding process.

A spherical plain bearing is known from DE 196 15 872 A1, of which the bearing socket and bearing body are both made of plastic, and which has, in one of its embodiments, a molded-on threaded stem.

The known rod ends made of plastic offer a significant weight saving as compared with metallic rod ends. A disadvantage in these designs is the relatively low strength of plastics and short fiber reinforced plastics, for which reason only relatively small loads can be transmitted with rod ends made of plastic.

SUMMARY OF THE INVENTION

The invention is based on the problem of developing a rod end that has a lower weight as compared with metallic solutions and at the same time can transmit high mechanical loads and can also be manufactured economically.

The present invention concerns a rod end with a bearing and where that bearing is at least partially enclosed by a component comprising a fiber-reinforced plastic that extends, at least partially, in the form of a loop around the bearing.

In certain embodiments, the fiber-reinforced plastic is a continuous-fiber reinforced thermoplastic.

In other embodiments, the bearing and/or the component is at least partially enclosed by a plastic. In further embodiments, the plastic is a thermoplastic that is short-fiber reinforced, long-fiber reinforced, or unreinforced thermoplastic.

In certain embodiments, the fiber-reinforced plastic forming a loop around the bearing extends at least partially into a threaded stem.

In some embodiments, the component comprises unidirectional continuous-fiber reinforced thermoplastic.

In other embodiments, the component comprises multiple layers of continuous-fiber reinforced thermoplastic. In certain embodiments, the bearing is fully enclosed one time or multiple times by continuous-fiber reinforced thermoplastic.

In other embodiments, the component extends in a threaded stem and conforms to a thread profile of the threaded stem.

In yet other embodiments, the component is connected to the enclosing short-fiber reinforced, long-fiber reinforced, or unreinforced thermoplastic. In some embodiments, the bearing is radially and axially surrounded by short-fiber reinforced, long-fiber reinforced, or unreinforced thermoplastic.

In certain other embodiments, the bearing comprises a metallic material, a plastic material, a fiber material, or combination thereof.

In certain embodiments, the component comprises one or more fibers selected from carbon fibers, basalt fibers, aramid fibers, plastic fibers, cotton fibers, metal fibers, glass fibers, and combinations thereof. In further embodiments, the plastic fibers are selected from polyamide fibers, polyester fibers, polyethylene fibers, and combinations thereof. In yet other embodiments, the component fibers are impregnated in thermoplastic material with a fiber volume fraction of at least 30%.

In certain embodiments, the rod end is an attachment element on a connecting rod with internal thread. In further embodiments, the rod end comprises a threaded stem, and the rod end is secured to the connecting rod by a lock washer and a lock nut.

In other embodiments, the rod end is in the form of a clevis. In yet other embodiments, the rod end is in the form of a swivel head.

In some embodiments, the loop fully surrounds the bearing multiple times and a thermoplastic further secures the bearing axially on a lateral surface of the bearing. In certain embodiments, the thermoplastic is a short-fiber reinforced thermoplastic, long-fiber reinforced thermoplastic, or unreinforced thermoplastic.

In certain embodiments, the plastic of the fiber-reinforced plastic is selected from polypropylene (PP), polyamide (PA), acrylonitrile butadiene styrene (ABS), polyethylene imine (PEI), polyphthalamide (PPA), polyphenylene sulfide (PPS), polyaryletherketone (PAEK), polyetherketoneketone (PEKK), polyetheretherketone (PEEK), and combinations thereof.

In other embodiments, the plastic of the short-fiber reinforced, long-fiber reinforced, or unreinforced thermoplastic is selected from polypropylene (PP), polyamide (PA), acrylonitrile butadiene styrene (ABS), polyethylene imine (PEI), polyphthalamide (PPA), polyphenylene sulfide (PPS), polyaryletherketone (PAEK), polyetherketoneketone (PEKK), polyetheretherketone (PEEK), and combinations thereof.

In certain embodiments, the fibers of the short-fiber reinforced thermoplastic and/or long-fiber reinforced thermoplastic are selected from carbon fibers, basalt fibers, aramid fibers, plastic fibers, cotton fibers, metal fibers, glass fibers, and combinations thereof. In further embodiments, the plastic fibers are selected from polyamide fibers, polyester fibers, polyethylene fibers, and combinations thereof.

DETAILED DESCRIPTION

Figure 1:
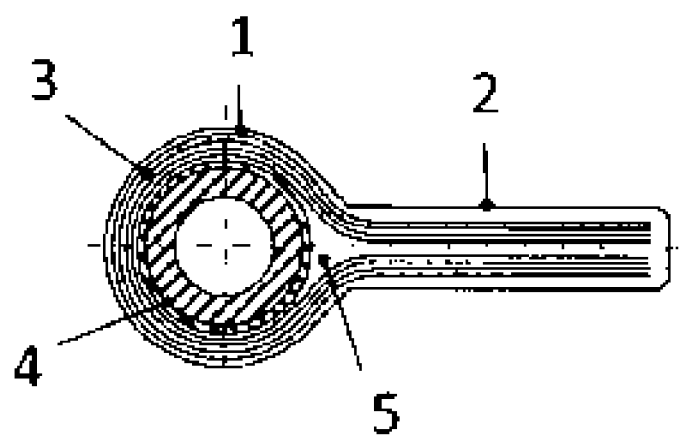
FIG. 1 illustrates a side cross-sectional view of a rod end (1) according to the invention with a threaded stem (2) and comprising a continuous-fiber reinforced composite material with thermoplastic matrix (3) in the form of a loop that partially surrounds a bearing (4), and a short-fiber reinforced, long-fiber reinforced, or unreinforced thermoplastic (5). The thermoplastic (5) fully surrounds the loop of fiber-reinforced thermoplastic (3) into the threaded stem (2). The short-fiber reinforced, long-fiber reinforced, or unreinforced thermoplastic (5) defines the outer contour of the rod end (1). The continuous-fiber reinforced composite material with thermoplastic matrix (3) is implemented in four layers in this representation.

The terms "comprising" and "comprises" in this disclosure can mean "including" and "includes" or can have the meaning commonly given to the term "comprising" or "comprises" in U.S. Patent Law. Terms "consisting essentially of" or "consists essentially of" if used in the claims have the meaning ascribed to them in U.S. Patent Law. Other aspects of the invention are described in or are obvious from (and within the ambit of the invention) the following disclosure.

The present invention solves the problems of the prior art by providing a rod end that has a low weight as compared with metallic rod ends while also being able to transmit high mechanical loads, unlike prior plastic rod ends, and can also be manufactured economically.

In certain embodiments, a rod end according to the present invention may be an attachment element for introducing tensile and compressive forces into various connecting rods, for example, for applications in the aviation field.

The rod end according to the present invention is also suitable for many other applications, in particular for the transmission of tensile and compressive forces, for guidance and mechanical mounting, and for supporting various connections or braces.

Conventional rod ends can be made from metal or plastic, but these have disadvantages such as high weight or inability to transmit high mechanical loads, respectively. In one aspect, the instant invention provides a rod end with a low weight in comparison to metallic rod ends and an ability to transmit high mechanical loads unlike conventional plastic rod ends, for example, as used in the aerospace and aviation fields.

In certain embodiments, the present invention achieves a high mechanical load capacity of a rod end by means of a loop that passes around a spherical plain bearing or a bushing and that is made of fiber-reinforced plastic. In certain embodiments, the fiber-reinforced plastic is a continuous-fiber reinforced composite material with thermoplastic matrix, such as a unidirectional continuous-fiber reinforced composite material with thermoplastic matrix. A fiber-reinforced plastic in which a fiber content of over 80% extends in the longitudinal direction of a fiber-reinforced plastic component of a rod end of the invention is referred to herein as a unidirectional fiber-reinforced plastic. A continuous fiber may be a single fiber or a bundle of fibers that originate in, e.g., a threaded stem of a rod end of the instant invention, wrap around a bearing or bushing in the rod end, and then terminate in the stem of the rod end. A continuous fiber is in contrast to a discontinuous fiber, such as a chopped fiber or broken stretched carbon fiber.

The present invention further concerns components comprising a fiber-reinforced plastic, such as a continuous-fiber reinforced composite material with a thermoplastic matrix. In certain embodiments, one or more fibers in the fiber-reinforced plastic are carbon fibers, basalt fibers, aramid fibers, plastic fibers, cotton fibers, metal fibers, glass fibers, and/or a combination thereof impregnated in plastic, such as a thermoplastic, material. In some embodiments, the fiber-reinforced plastic is made of fibers impregnated in plastic, such as a thermoplastic, material with a fiber volume fraction of at least 30%, at least 35%, at least 40%, at least 45%, at least 50%, at least 55%, at least 60%, at least 65%, at least 70%, at least 75%, at least 80%, at least 85%, or at least 90%.

In certain embodiments, a component comprising fiber-reinforced plastic, such as a continuous-fiber reinforced composite material with thermoplastic matrix, extends into a threaded stem of a rod end of the invention. The threaded stem can be implemented with an external or an internal thread. All known types of internal and external thread can be used, including special thread forms that may be used as well. By way of example, round thread, trapezoidal thread, buttress thread, and triangular thread are known thread types that may be used. An external thread is one that is present on the exterior, e.g., the exterior of a stem of a rod end. Conversely, an internal thread is one that is present on the interior, e.g., the interior of a stem of a rod end.

In certain further embodiments, a short-fiber reinforced, long-fiber reinforced, or unreinforced plastic, such as thermoplastic, fully or partially surrounds the loop of fiber-reinforced plastic into the threaded stem, and fully or partially defines the outer contour of the rod end.

In some embodiments, the loop of fiber-reinforced plastic has a thermoplastic matrix, by which means the fiber reinforced plastic can form an integral connection with the short-fiber reinforced, long-fiber reinforced, or unreinforced thermoplastic.

Any suitable method for making a bearing, a fiber-reinforced plastic, and/or a short-fiber reinforced plastic, long-fiber reinforced plastic, or unreinforced plastic for use in a rod end of the invention may be employed.

Likewise, any suitable method may be used for creating an integral connection between one or more of a bearing, fiber-reinforced plastic, or short-fiber reinforced, long-fiber reinforced, or unreinforced plastic in a rod end of the invention. In certain embodiments, by way of non-limiting example, a method for making an integral connection that positions a fiber-reinforced plastic component and a bearing in a rod end of the invention may be through injection molding, such that the fiber-reinforced plastic and bearing are precisely positioned with respect to one another. In other embodiments, use of injection molding may similarly be used to create an integral connection between a fiber-reinforced plastic component and a short-fiber reinforced, long-fiber reinforced, or unreinforced thermoplastic in a rod end of the invention, such that the fiber-reinforced plastic component and surrounding thermoplastic are precisely positioned with respect to one another.

Examples of plastics that may be used for the fiber-reinforced plastic component include polypropylene (PP), polyamide (PA), acrylonitrile butadiene styrene (ABS), polyethylene imine (PEI), polyphthalamide (PPA), polyphenylene sulfide (PPS), polyaryletherketone (PAEK), polyetherketoneketone (PEKK), polyetheretherketone (PEEK), and combinations thereof.

Examples of fibers that may be used in the fiber-reinforced plastic component include carbon fibers, basalt fibers, aramid fibers, plastic fibers (including polyamide fibers, polyester fibers, polyethylene fibers and others), cotton fibers, metal fibers, glass fibers, and combinations thereof.

Examples of plastics that may be used for the short-fiber reinforced, long-fiber reinforced, and/or unreinforced plastic include: polypropylene (PP), polyamide (PA), acrylonitrile butadiene styrene (ABS), polyethylene imine (PEI), polyphthalamide (PPA), polyphenylene sulfide (PPS), polyaryletherketone (PAEK), polyetherketoneketone (PEKK), polyetheretherketone (PEEK), and combinations thereof.

Examples of fibers that may be used in the short-fiber reinforced or long-fiber reinforced plastic include carbon fibers, basalt fibers, aramid fibers, plastic fibers (including polyamide fibers, polyester fibers, polyethylene fibers and others), cotton fibers, metal fibers, glass fibers, and combinations thereof. Short fibers for use in the short-fiber reinforced plastic according to the invention typically range from 0.1 mm to 1 mm in length. Long fibers for use in the long-fiber reinforced plastic according to the invention typically range from 1 mm to 50 mm in length.

The fibers in the short- or long-fiber reinforced plastic may be oriented in any suitable direction, including unidirectional and/or random directions.

To increase the content of the fiber-reinforced plastic, such as continuous-fiber reinforced composite material with thermoplastic matrix, in a rod end of the invention, the fiber-reinforced plastic may be implemented in the rod end as multiple layers. The multiple layers may all be the same, differing, or have a varying combination of the same and differing fiber-reinforced material. In one exemplary embodiment, one layer may be a multi-directional continuous-fiber reinforced thermoplastic while two additional layers are unidirectional continuous-fiber reinforced thermoplastic.

In some embodiments, to better accommodate tensile and compressive forces, a fiber-reinforced plastic, such as a unidirectional fiber-reinforced plastic, can, in addition, fully surround a spherical plain bearing or a bushing one time or multiple times in accordance with the invention.

In certain embodiments, the instant invention includes one or more holes for accommodating a pin. Additionally, a spherical plain bearing; a bushing; and the outer ring of an articulated element, bushing, or spherical plain bearing, are also referred to herein as bearings. Generally, a bearing may support one or more components that move against each other.

In certain embodiments, the bearing comprises a metallic material, a plastic material, a fiber composite material, or a combination thereof.

In some embodiments, the present invention achieves a high mechanical load capacity of a rod end by means of a fiber-reinforced plastic, such as a continuous-fiber reinforced composite material with thermoplastic matrix, that extends in the form of a loop, at least partially, around a bearing, and where the fiber-reinforced plastic also extends into the threaded stem.

"In the form of a loop" means surrounding or encircling of a bearing by fiber-reinforced plastic, such as a continuous-fiber reinforced composite material with thermoplastic matrix, with a wrap angle of more than 160°. In certain embodiments, the wrap angle is more than 180°.

In some embodiments, the rod end comprises a ring, which may be made of continuous-fiber reinforced composite material. Use of a ring in a rod end of the invention provides increased mechanical load capacity without having to increase the rod end's outer dimensions or total weight, which are properties of high importance, for instance, in the field of aerospace components.

In certain embodiments, the ring encircles at least a portion of the fiber-reinforced (e.g., continuous-fiber reinforced) plastic component that surrounds the bearing and extends into the rod end stem. In embodiments comprising a ring, the ring is typically placed in the stem of the rod end such that the ring encircles a portion of the fiber-reinforced (e.g., continuous-fiber reinforced) plastic component that is in the rod end stem. Generally, the ring is located in the upper end of the rod end stem. In certain embodiments, the ring is located in the rod end stem just before the fiber-reinforced plastic component splits to form a loop around the bearing. In certain embodiments, the ring prevents the loop from breaking open. In some embodiments, the fiber-reinforced plastic component comprises multiple layers of continuous-fiber reinforced thermoplastic, and the ring encircles a portion of the multilayered continuous-fiber reinforced thermoplastic in the rod end stem.

In certain embodiments, the ring encircles and is in direct contact with the fiber-reinforced (e.g., continuous-fiber reinforced) plastic component. In other embodiments, the ring encircles at least a portion of the fiber-reinforced plastic component but does not directly contact the fiber-reinforced plastic component portion the ring is encircling. In embodiments where the ring does not directly contact the fiber-reinforced plastic component the ring is encircling, the ring may be connected, e.g., on its inner surface, to the fiber-reinforced first plastic component via a short-fiber reinforced, long-fiber reinforced, or unreinforced second plastic. In these embodiments, the short-fiber reinforced, long-fiber reinforced, or unreinforced second plastic contacts both the fiber-reinforced first plastic component and the ring, thereby connecting the component and ring to one another.

In some embodiments, the ring itself is enclosed by a short-fiber reinforced, long-fiber reinforced, or unreinforced thermoplastic that surrounds and is in contact with the ring. In a particular embodiment, the short-fiber reinforced, long-fiber reinforced, or unreinforced thermoplastic fully surrounds the ring and is in contact with all surfaces of the ring such that the ring is effectively encapsulated by the short-fiber-reinforced, long-fiber reinforced, or unreinforced thermoplastic.

In certain embodiments, the bearing, the fiber-reinforced first plastic component, and/or the ring is at least partially enclosed by the short-fiber-reinforced, long-fiber-reinforced, or unreinforced second plastic. In a particular embodiment, the bearing, the fiber-reinforced first plastic component, and the ring are all at least partially enclosed by the short-fiber-reinforced, long-fiber-reinforced, or unreinforced second plastic.

Typically, the lower end of the rod end stem is threaded. In some embodiments, the thread extends over a ring in the stem, e.g., the thread extends from the lower to upper stem end, including over the upper end of the stem where the ring may be situated. In other embodiments, the thread does not extend over a ring in the stem, e.g., the ring is located in the upper end of the stem and only the lower end of the rod end stem is threaded. In certain embodiments, fibers in the fiber-reinforced plastic component conform to a thread profile adjacent to a surface of the threaded stem. In certain embodiments, a ring is in the upper end of the stem and fibers in the fiber-reinforced plastic component conform to a thread profile that is in the lower end of the rod end stem.

In embodiments where the rod end comprises a ring, the ring diameter may be the same diameter as the rod end stem diameter. In embodiments where the ring forms an outer contour of the rod end stem, the short-fiber-reinforced, long-fiber-reinforced, or unreinforced plastic does not encapsulate the ring. Rather, if in contact with the ring in this embodiment, the short-fiber-reinforced, long-fiber-reinforced, or unreinforced plastic contacts one or more sides of the ring that do not form an outer contour of the rod end stem. In other embodiments, the ring diameter may be less than the stem diameter, e.g., when the ring is fully surrounded by a short-fiber-reinforced, long-fiber-reinforced, or unreinforced thermoplastic. In embodiments where the ring diameter is less than the stem diameter, the short-fiber-reinforced, long-fiber-reinforced, or unreinforced thermoplastic may form the outer contour of the rod end stem. In yet other embodiments, the ring diameter is greater than the diameter of the rod end stem, e.g., in embodiments where the ring protrudes over the stem.

A radius of the ring may be any suitable radius. Likewise, the width of the ring may be any suitable width. In some embodiments, the ring does not extend beyond a fiber-reinforced (e.g., continuous-fiber reinforced) plastic component that is form fit in the rod end stem. See, for example, the embodiment depicted in FIG. 12.

In some embodiments, the ring comprises continuous-fiber reinforced material. In certain embodiments, the fibers in the continuous-fiber reinforced material of the ring are circumferential fibers.

Examples of suitable compounds that may be used to make a ring for use in a rod end of the invention include polypropylene (PP), polyamide (PA), acrylonitrile butadiene styrene (ABS), polyethylene imine (PEI), polyphthalamide (PPA), polyphenylene sulfide (PPS), polyaryletherketone (PAEK), polyetherketoneketone (PEKK), polyetheretherketone (PEEK), and combinations thereof. Likewise, the ring may comprise epoxy resin or any other suitable thermoset material. In some embodiments, the ring comprises a metallic material. In certain embodiments, the ring comprises any kind of steel or aluminum alloy, and combinations thereof.

Examples of fibers that may be used in a continuous-fiber reinforced ring include carbon fibers, basalt fibers, aramid fibers, plastic fibers (including polyamide fibers, polyester fibers, polyethylene fibers and others), cotton fibers, metal fibers, glass fibers, and combinations thereof.

Figure 6:
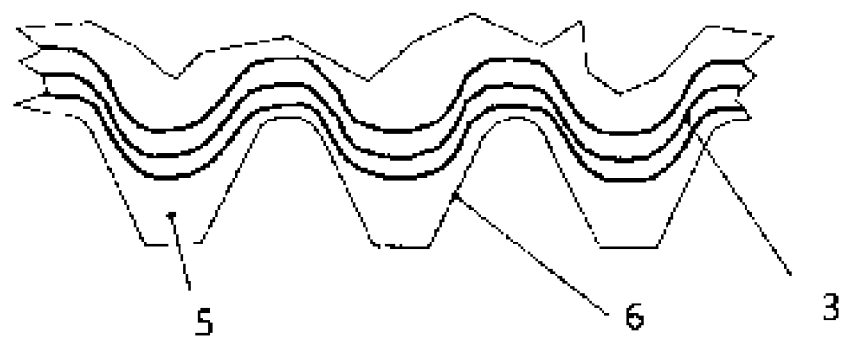
FIG. 6 illustrates a cross-sectional view of a thread profile (6) according to the invention made of short-fiber reinforced, long-fiber reinforced, or unreinforced thermoplastic (5) and a continuous-fiber reinforced composite material with thermoplastic matrix (3), wherein the continuous-fiber reinforced composite material with thermoplastic matrix (3) extends along the thread flanks.

In certain embodiments, the fiber-reinforced plastic component in the threaded stem strengthens the rod end against a breaking away of the threaded stem. In addition, in further embodiments, a course of fibers, such as continuous fibers, conforms to a thread profile near the surface of the threaded stem in a shape projected by the fibers into the thread ridges, e.g., as in FIG. 6, and strengthens the threaded stem against shearing off of the thread ridges. For example, in certain embodiments, the fibers are continuous fibers that conform to a thread profile near the surface of a threaded stem. FIG. 6 shows where continuous fibers have conformed to the thread ridges of the threaded stem shape. By having the continuous fibers conform to the profile near the surface of the threaded stem, the threaded stem is strengthened against shearing off of the thread ridges.

Additionally, in certain embodiments, the fiber-reinforced (e.g., continuous-fiber reinforced) plastic component has a shape that enables a form fit. For example, in certain embodiments, the fiber-reinforced plastic component comprises a composite material that may be shaped into a form fit in the stem of a rod end of the invention. Thus, in some embodiments, the fiber-reinforced plastic component extends into the threaded stem of the rod end and is shaped to enable a form fit in the stem. In further embodiments, the fiber-reinforced plastic component is wrapped, at least partially, one or more times around a bearing or bushing in the rod end and is shaped into a form fit in the threaded stem of the rod end. In some embodiments, the fiber-reinforced first plastic component is form fitted with a short-fiber-reinforced, long-fiber-reinforced, or unreinforced second plastic material. In embodiments where the fiber-reinforced first plastic component is form fitted with a short-fiber-reinforced, long-fiber-reinforced, or unreinforced second plastic, there is typically positive locking between the two plastics. The positive locking can be achieved by shaping each plastic such that, e.g., the two plastics have complementary shapes (e.g., complementary undercuts on each plastic) that fit and lock each plastic to one another in the rod end stem.

The form fit configuration could be any suitable shape and configuration. In some embodiments, the form fit comprises a configuration comprising one or more angled shapes. In other embodiments, the form fit configuration comprises one or more curved shapes. In yet other embodiments, the form fit configuration comprises both angled and curved shapes.

In other embodiments, the form-fitting fiber-reinforced first plastic component maintains a constant or nearly constant cross-sectional area in the threaded stem. The constant cross-sectional area enables production from continuous-fiber reinforced semi-finished products, such as, for example, unidirectional fiber-reinforced thermoplastic tape material (UD-Tapes) or unidirectional fiber-reinforced composite profiles (UD-Profiles). As a result, the fiber volume content in the continuous-fiber reinforced first plastic component part is consistent, and the fibers are continuous without being cut, an advantage since cutting fibers weakens the finished rod end.

A fiber-reinforced (e.g., continuous-fiber reinforced) plastic component with a form fit in the rod end stem also allows for, e.g., an increased mechanical load capacity of the rod end without having to increase its outer dimensions or total weight, properties important, for instance, in the field of aerospace components.

To accommodate forces that act axially, a bearing, such as a spherical plain bearing or bushing, can also be partially or fully secured in a positive-locking manner by short-fiber reinforced, long-fiber reinforced, or unreinforced thermoplastic over one or more lateral surfaces or contours introduced into the bearing, e.g., the spherical plain bearing or bushing.

In some embodiments, a continuous-fiber reinforced first plastic component, such as a form-fit plastic component, is surrounded by a second plastic that is a short-fiber reinforced, long-fiber reinforced, or unreinforced thermoplastic that also provides a thread on the surface of the stem, e.g., by placing the continuous-fiber reinforced first plastic component together with a bearing and in certain embodiments, a ring, in a mold in an injection molding machine and injecting the second plastic into the mold such that the second plastic surrounds the first plastic component, bearing, and ring to form the outer contour of the rod end and provide the thread in the rod end stem. In embodiments where the ring is the same diameter as the rod end stem, the ring forms a contour of the rod end stem coincident with a contour formed by the second plastic in the rod end stem.

Generally, rod ends are used in an extremely wide variety of sizes and in high quantities. In certain embodiments of the invention, the inventive rod ends are in the form of clevises or swivel heads.

FIG. 1 illustrates a side cross-sectional view of a rod end (1) according to the invention. FIG. 1 depicts a threaded stem (2) with a bearing (4). The threaded stem (2) is adjacent to the bearing (4). The central axis of the stem (2) intersects the center of the bearing (4). A continuous-fiber reinforced material with thermoplastic matrix (3) extends into the stem (2). FIG. 1 also illustrates a continuous-fiber reinforced composite material with thermoplastic matrix (3) in the form of a loop. The continuous-fiber reinforced composite material with thermoplastic matrix (3) is a loop that partially surrounds the bearing (4). The bearing (4), however, is not exposed because the remaining "free space" is filled by a short-fiber reinforced, long-fiber reinforced, or unreinforced thermoplastic (5). The thermoplastic (5) also surrounds the fiber-reinforced thermoplastic (3) into the stem (2) and forms the outer contour of the rod end (1). The continuous-fiber reinforced composite material with thermoplastic matrix (3) is implemented in four layers in this representation.

Figure 2:
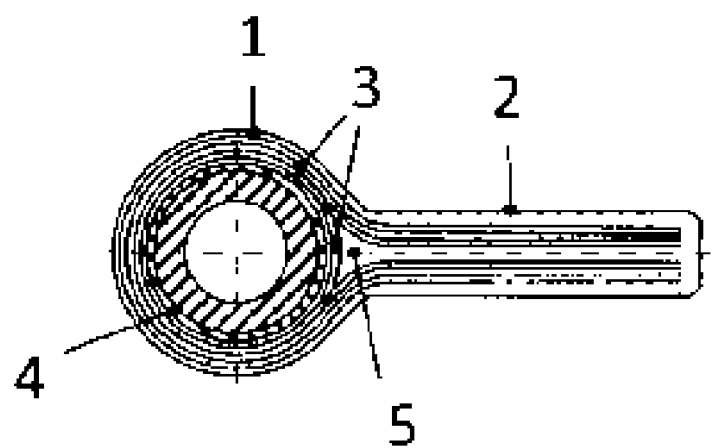
FIG. 2 illustrates a side cross-sectional view of a rod end (1) according to the invention with a threaded stem (2) and comprising a continuous-fiber reinforced composite material with thermoplastic matrix (3) in the form of a loop, which fully surrounds a bearing (4) multiple times, and a short-fiber reinforced, long-fiber reinforced, or unreinforced thermoplastic (5). The thermoplastic (5) fully surrounds the loop of fiber-reinforced thermoplastic (3) into the threaded stem (2). The short-fiber reinforced, long-fiber reinforced, or unreinforced thermoplastic (5) defines the outer contour of the rod end (1).

FIG. 2 illustrates a side cross-sectional sectional view of a rod end (1) according to the invention with a threaded stem (2) and comprising a continuous-fiber reinforced composite material with thermoplastic matrix (3) in the form of a loop. Here, the loop fully surrounds a bearing (4) multiple times. There is a short-fiber reinforced, long-fiber reinforced, or unreinforced thermoplastic (5) that surrounds the fiber-reinforced thermoplastic matrix (3) into the stem (2) and forms the outer contour of the rod end (1). The bearing (4) is fully surrounded by the continuous-fiber reinforced composite material with thermoplastic matrix (3).

Figure 3:
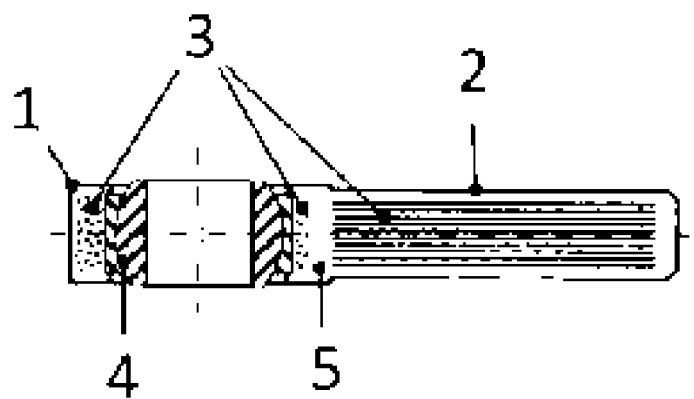
FIG. 3 illustrates a side cross-sectional view of a rod end (1) according to the invention with a threaded stem (2) and comprising a continuous-fiber reinforced composite material with thermoplastic matrix (3) in the form of a loop, which fully surrounds a bearing (4) multiple times, and a short-fiber reinforced, long-fiber reinforced, or unreinforced thermoplastic (5), which also secures the bearing (4) axially on its lateral surfaces. The thermoplastic (5) fully surrounds the loop of fiber-reinforced thermoplastic (3) into the threaded stem (2). The short-fiber reinforced, long-fiber reinforced, or unreinforced thermoplastic (5) defines the outer contour of the rod end (1).

FIG. 3 illustrates a cross-sectional view of a rod end (1) according to the invention with a threaded stem (2) and comprising a continuous-fiber reinforced composite material with thermoplastic matrix (3) in the form of a loop. The continuous-fiber reinforced thermoplastic (3) fully surrounds a bearing (4) multiple times. FIG. 3 further illustrates a short-fiber reinforced, long-fiber reinforced, or unreinforced thermoplastic (5), which also secures the bearing (4) axially on the bearing's (4) lateral surfaces.

Figure 4:
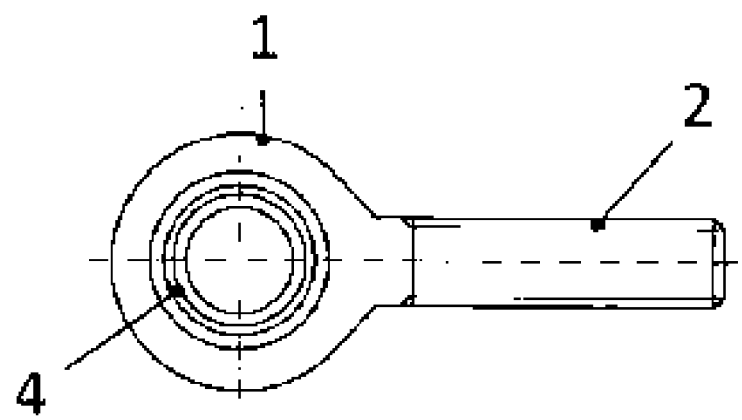
FIG. 4 illustrates a side view of a rod end (1) according to the invention with threaded stem (2) and a bearing (4).

FIG. 4 illustrates a side view of the outside of a rod end (1) according to the invention with a bearing (4) and threaded stem (2). The material on the surface of the rod end (1) is made of short-fiber reinforced, long-fiber reinforced, or unreinforced thermoplastic (5). FIG. 4 further illustrates a thread of the threaded stem (2) as depicted for a technical drawing as would be appreciated by a person of ordinary skill in the art.

Figure 5:
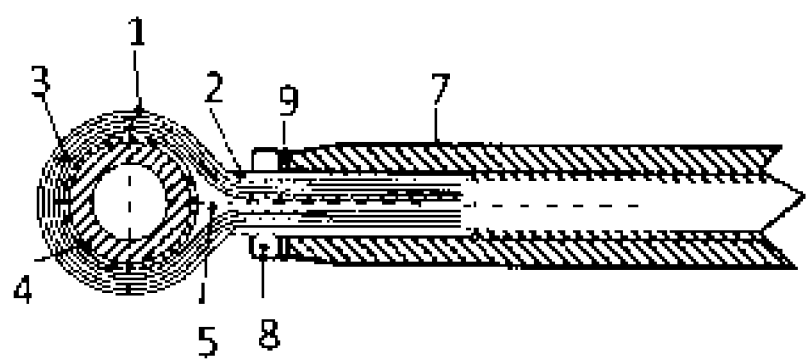
FIG. 5 illustrates a side cross-sectional view of a rod end (1) according to the invention with a threaded stem (2) and comprising a continuous-fiber reinforced composite material with thermoplastic matrix (3) in the form of a loop that surrounds a bearing (4), and a short-fiber reinforced, long-fiber reinforced, or unreinforced thermoplastic (5), built into a connecting rod with an internal thread (7) and secured by a lock washer (9) and a lock nut (8). The thermoplastic (5) fully surrounds the loop of fiber-reinforced thermoplastic (3) into the threaded stem (2). The short-fiber reinforced, long-fiber reinforced, or unreinforced thermoplastic (5) defines the outer contour of the rod end (1).

FIG. 5 illustrates a side cross-sectional view of a rod end (1) according to the invention with a threaded stem (2) and comprising a continuous-fiber reinforced composite material with thermoplastic matrix (3) in the form of a loop and a short-fiber reinforced, long-fiber reinforced, or unreinforced thermoplastic (5), built into a connecting rod with an internal thread (7) and secured by a lock washer (9) and a lock nut (8).

FIG. 6 illustrates a cross-sectional view of a thread profile (6) according to the invention made of short-fiber reinforced, long-fiber reinforced, or unreinforced thermoplastic (5) and a continuous-fiber reinforced composite material with thermoplastic matrix (3). FIG. 6 shows where the continuous-fiber reinforced composite material with thermoplastic matrix (3) extends along the thread flanks.

Figure 7:
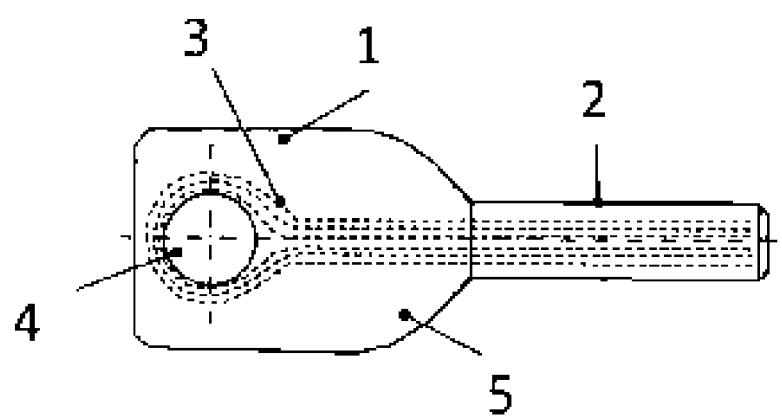
FIG. 7 illustrates a side cross-sectional view of a rod end (1) according to the invention in the form of a clevis (1), comprising a bearing (4), and threaded stem (2) with, shown in dashed lines, an internal, continuous-fiber reinforced composite material with thermoplastic matrix (3) in the form of a loop, and a short-fiber reinforced, long-fiber reinforced, or unreinforced thermoplastic (5). The thermoplastic (5) fully surrounds the loop of fiber-reinforced thermoplastic (3) into the threaded stem (2). The short-fiber reinforced, long-fiber reinforced, or unreinforced thermoplastic (5) defines the outer contour of the rod end (1). The continuous-fiber reinforced composite material with thermoplastic matrix (3) is implemented in three layers in this representation.

FIG. 7 illustrates a side cross-sectional view of a rod end (1) according to the invention in the form of a clevis, and comprising a bearing (4), and threaded stem (2). Shown in dashed lines is an internal continuous-fiber reinforced composite material with thermoplastic matrix (3) in the form of a loop, and a short-fiber reinforced, long-fiber reinforced, or unreinforced thermoplastic (5). The continuous-fiber reinforced composite material with thermoplastic matrix (3) is implemented in three layers in this illustration.

Figure 8:
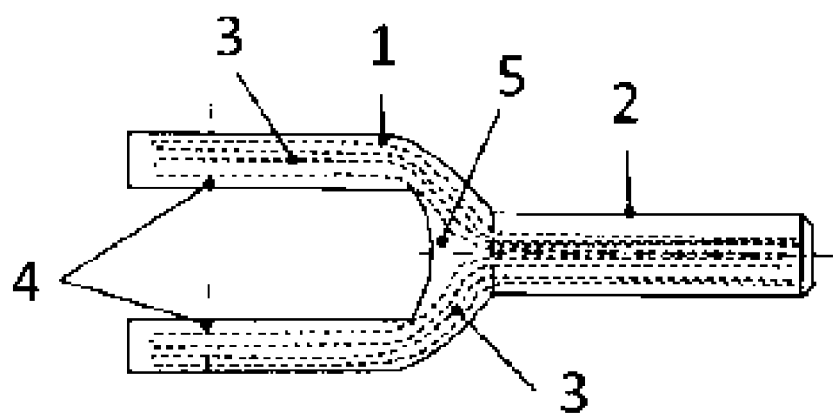
FIG. 8 illustrates a cross-sectional view of the rod end (1) of FIG. 7, rotated by 90°.

FIG. 8 illustrates a cross-sectional view of the rod end of FIG. 7, rotated by 90°.

Figure 9:
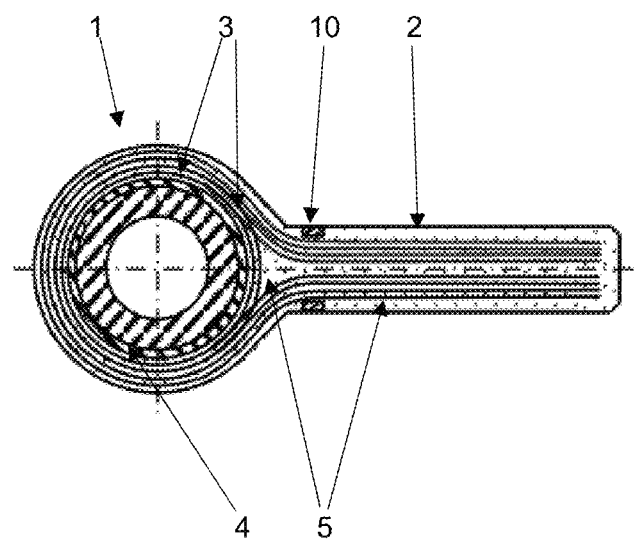
FIG. 9 illustrates a side cross-sectional view of a rod end (1) of the invention having a ring (10) encircling a continuous-fiber reinforced composite material with thermoplastic matrix (3) in the form of a loop.

FIG. 9 illustrates a side cross-sectional sectional view of a rod end (1) according to the invention with a threaded stem (2) and ring (10) and comprising a continuous-fiber reinforced composite material with thermoplastic matrix (3) in the form of a loop. In this embodiment, the loop fully surrounds a bearing (4) multiple times. There is a short-fiber reinforced, long-fiber reinforced, or unreinforced thermoplastic (5) that surrounds the fiber-reinforced thermoplastic matrix (3) into the stem (2) and forms an outer contour of the rod end (1). The bearing (4) is fully surrounded by the continuous-fiber reinforced composite material with thermoplastic matrix (3). A ring (10) encircles a portion of the continuous-fiber reinforced composite material with thermoplastic matrix (3) at the upper end of the threaded stem (2). FIG. 9 depicts a rod end with a swivel head.

Figure 10:
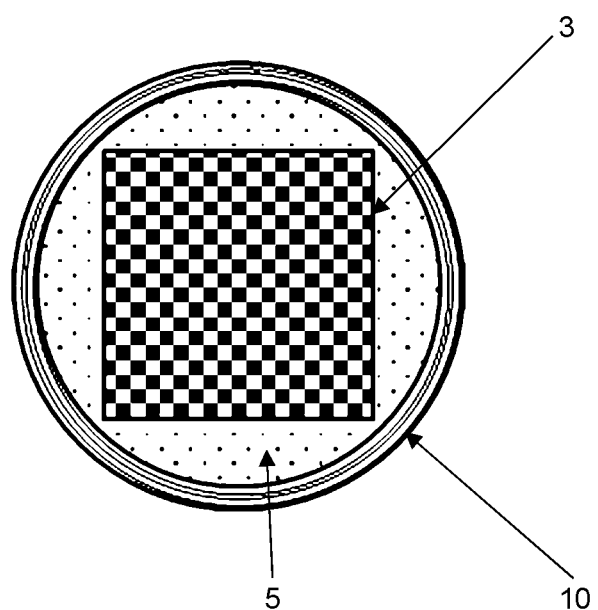
FIG. 10 illustrates a cross-sectional view of a stem of a rod end of the invention having a ring (10) that encircles a continuous-fiber reinforced composite material with thermoplastic matrix (3) and short-fiber reinforced, long-fiber reinforced, or unreinforced thermoplastic (5).

FIG. 10 illustrates a cross-sectional view of a stem of a rod end of the invention having a continuous-fiber reinforced ring (10) encircling a continuous-fiber reinforced composite material with thermoplastic matrix (3) and short-fiber reinforced, long-fiber reinforced, or unreinforced thermoplastic (5). The ring (10) forms an outer contour of the rod end stem.

Figure 11:
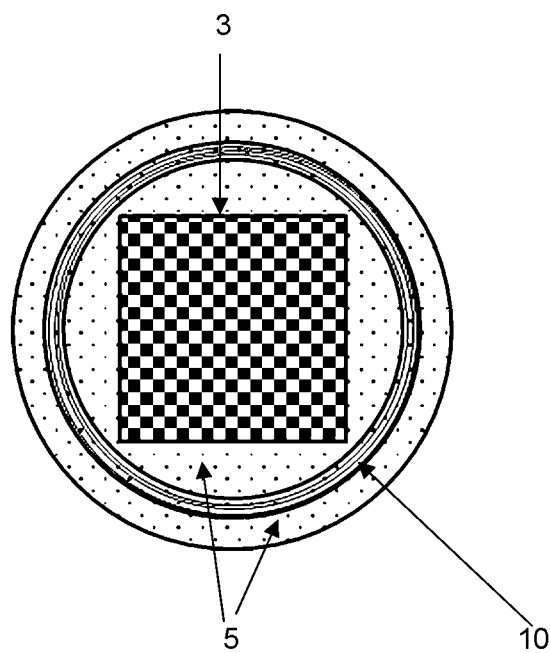
FIG. 11 illustrates a cross-sectional view of a stem of a rod end of the invention having a ring (10) that encircles a continuous-fiber reinforced composite material with thermoplastic matrix (3) and short-fiber reinforced, long-fiber reinforced, or unreinforced thermoplastic (5). The short-fiber reinforced, long-fiber reinforced, or unreinforced thermoplastic (5) also surrounds the ring (10) such that the short-fiber reinforced, long-fiber reinforced, or unreinforced thermoplastic (5) encapsulates the ring (10).

FIG. 11 illustrates a cross-sectional view of a stem of a rod end of the invention having a continuous-fiber reinforced ring (10) encircling a continuous-fiber reinforced composite material with thermoplastic matrix (3) and short-fiber reinforced, long-fiber reinforced, or unreinforced thermoplastic (5). The short-fiber reinforced, long-fiber reinforced, or unreinforced thermoplastic (5) also surrounds the continuous-fiber reinforced ring (10) and forms the outer contour of the rod end stem.

Figure 12:
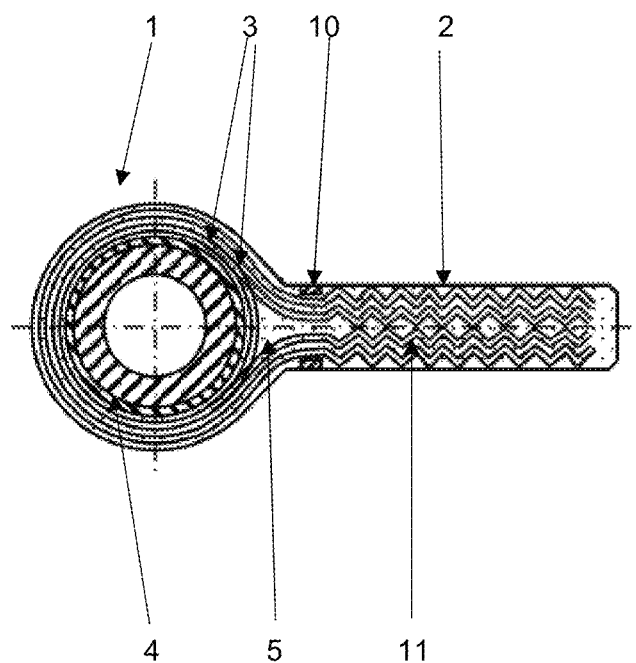
FIG. 12 illustrates a side cross-sectional sectional view of a rod end (1) of the invention with a threaded stem (2) having a ring (10) that encircles a continuous-fiber reinforced composite material with thermoplastic matrix (3) in the form of a loop. In the threaded stem (2), the continuous-fiber reinforced composite material (3) has a shape that enables a form fit (11) and maintains a constant or nearly constant cross-sectional area.

FIG. 12 illustrates a side cross-sectional sectional view of a rod end (1) according to the invention with a threaded stem (2) and a ring (10) and having a continuous-fiber reinforced composite material with thermoplastic matrix (3) in the form of a loop. The loop fully surrounds a bearing (4) multiple times. There is a short-fiber reinforced, long-fiber reinforced, or unreinforced thermoplastic (5) that surrounds the fiber-reinforced thermoplastic matrix (3) into the stem (2) and forms an outer contour of the rod end (1). The bearing (4) is fully surrounded by the continuous-fiber reinforced composite material with thermoplastic matrix (3). The ring (10) encircles a portion of the continuous-fiber reinforced composite material with thermoplastic matrix (3) in an upper portion of the threaded stem and forms an outer contour of the stem. The continuous-fiber reinforced composite material with thermoplastic matrix (3) is shaped into a form fit (11) while maintaining a constant or nearly constant cross-sectional area in the threaded stem (2). Thus, here the plastic component (3) form fits in the stem while wrapping around the bearing (4) in the other end of the rod end. The form fit of the plastic component (3) results in the continuous-fiber reinforced composite material with thermoplastic matrix (3) being in a form fit configuration with the short-fiber reinforced, long-fiber reinforced, or unreinforced thermoplastic material (5) in the rod end stem.

Figure 13:
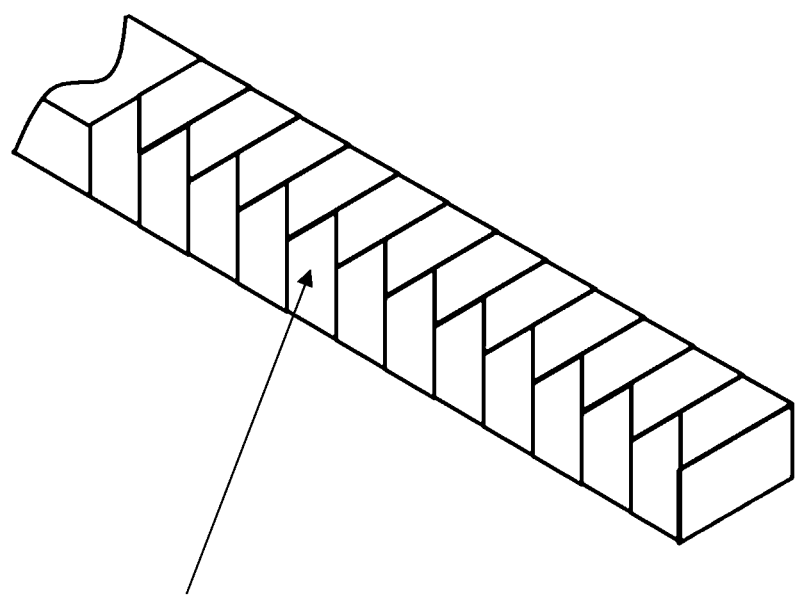
FIG. 13 illustrates an isometric view of an interior part of an unfinished stem of a rod end of the invention. The interior part is a continuous-fiber reinforced plastic component having a composite material with a form fit shape (11) while maintaining a constant or nearly constant cross-sectional area.
Figure 14:
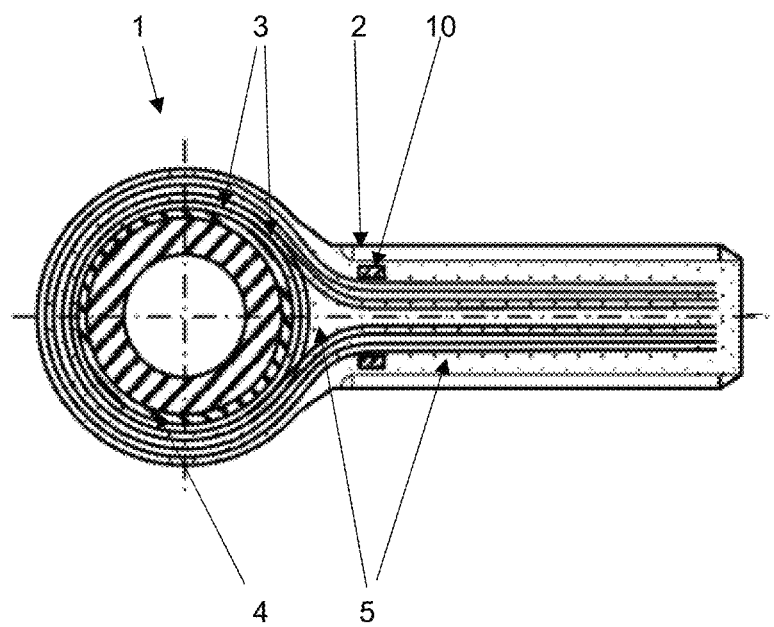
FIG. 14 illustrates a side cross-sectional view of a rod end (1) of the invention having a ring (10) encircling a continuous-fiber reinforced composite material with thermoplastic matrix (3) in the form of a loop wherein a thread of a threaded stem (2) extends over the ring (10).

FIG. 13 illustrates an isometric view of an interior part of an unfinished stem of a rod end of the invention. The interior part is a continuous-fiber reinforced plastic component (3) having a composite material with a form fit shape (11) while maintaining a constant or nearly constant cross-sectional area. Generally, to become a finished stem, the form-fit first plastic component may then be surrounded by a second plastic that is a short-fiber reinforced, long-fiber reinforced, or unreinforced thermoplastic that also provides a thread on the surface of the stem, e.g., by placing the form-fit first plastic component in a mold in an injection molding machine and injecting the second plastic into the mold such that the second plastic surrounds the form-fit first plastic component to form the outer contour of the rod end stem and provide the thread.

Modifications to the above would be obvious to those of ordinary skill in the art, but would not bring the invention so modified beyond the scope of the present invention. The claims to follow should be construed to cover such situations.

The invention claimed is:

1. A rod end comprising a bearing, wherein the bearing is at least partially enclosed by a component comprising a first plastic, wherein the first plastic is a fiber-reinforced first plastic that extends, at least partially, in the form of a loop around the bearing, wherein the fiber-reinforced first plastic forming the loop around the bearing extends at least partially into a threaded stem, wherein a ring encircles at least a portion of the fiber-reinforced first plastic in the threaded stem, wherein the ring is a continuous-fiber reinforced ring, and wherein the bearing, component, and/or ring is at least partially enclosed by a second plastic.

2. The rod end according to claim 1, wherein the fiber-reinforced first plastic is a continuous-fiber reinforced thermoplastic.

3. The rod end according to claim 1, wherein the continuous-fiber reinforced ring comprises fibers oriented in a circumferential direction.

4. The rod end according to claim 1, wherein the ring comprises a material selected from the group consisting of: polypropylene (PP), polyamide (PA), acrylonitrile butadiene styrene (ABS), polyethylene imine (PEI), polyphthalamide (PPA), polyphenylene sulfide (PPS), polyaryletherketone (PAEK), polyetherketoneketone (PEKK), polyetheretherketone (PEEK), thermoset materials, epoxy resin, metallic materials, steel, aluminum alloys, and combinations thereof.

5. The rod end according to claim 1, wherein the ring comprises one or more fibers selected from the group consisting of: carbon fibers, basalt fibers, aramid fibers, plastic fibers, cotton fibers, metal fibers, glass fibers, and combinations thereof.

6. The rod end according to claim 1, wherein the second plastic is a short-fiber reinforced thermoplastic, long-fiber reinforced thermoplastic, or unreinforced thermoplastic.

7. The rod end according to claim 1, wherein the component comprises multiple layers of continuous-fiber reinforced thermoplastic, and the ring encircles a portion of the multilayered continuous-fiber reinforced thermoplastic.

8. The rod end according to claim 1, wherein the fiber-reinforced first plastic comprises a shape that is complementary to a shape in the threaded stem.

9. The rod end according to claim 8, wherein the form fit of the fiber-reinforced first plastic comprises a constant or nearly constant cross-sectional area in the threaded stem.

10. The rod end according to claim 1, wherein fibers in the fiber-reinforced first plastic conform to a thread profile adjacent to a surface of the threaded stem.

11. The rod end according to claim 1, wherein a thread of the threaded stem extends over the ring.

12. A rod end comprising a bearing, wherein the bearing is at least partially enclosed by a component comprising a first plastic, wherein the first plastic is a fiber-reinforced first plastic that extends, at least partially, in the form of a loop around the bearing, wherein the fiber-reinforced first plastic forming the loop around the bearing extends at least partially into a threaded stem, wherein the component comprising the first plastic is at least partially enclosed by a second plastic, and wherein the first plastic is complementary to a shape of the second plastic in the threaded stem such that the first and second plastics fit and lock into one another in the threaded stem.

13. The rod end according to claim 12, wherein the fiber-reinforced first plastic comprises a constant or nearly constant cross-sectional area in the threaded stem.

14. The rod end according to claim 12, wherein the shape of the fiber-reinforced first plastic locks together with a complementary shape of the second plastic in a configuration comprising one or more shapes selected from the group consisting of: angled shapes and curved shapes.

15. The rod end according to claim 12, comprising a ring in the threaded stem that encircles at least a portion of the fiber-reinforced first plastic.

16. The rod end according to claim 15, wherein the ring is a continuous-fiber reinforced ring.

17. The rod end according to claim 12, wherein the first plastic and/or the second plastic is selected from the group consisting of: polypropylene (PP), polyamide (PA), acrylonitrile butadiene styrene (ABS), polyethylene imine (PEI), polyphthalamide (PPA), polyphenylene sulfide (PPS), polyaryletherketone (PAEK), polyetherketoneketone (PEKK), polyetheretherketone (PEEK), and combinations thereof.

\* \* \* \* \*